(12) United States Patent
Zhu et al.

(10) Patent No.: US 11,199,875 B2
(45) Date of Patent: Dec. 14, 2021

(54) DISPLAY DEVICE

(71) Applicant: Yungu (Gu'an) Technology Co., Ltd., Langfang (CN)

(72) Inventors: Zhaoji Zhu, Langfang (CN); Liwei Ding, Langfang (CN); Yuhua Wu, Langfang (CN); Yongfeng Zhao, Langfang (CN); Hongqi Hou, Langfang (CN); Fu Liao, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 16/992,587

(22) Filed: Aug. 13, 2020

(65) Prior Publication Data
US 2020/0371554 A1    Nov. 26, 2020

Related U.S. Application Data

(63) Continuation of application No. PCT/CN2019/094274, filed on Jul. 1, 2019.

(30) Foreign Application Priority Data

Nov. 13, 2018 (CN) .......................... 201811349063.2

(51) Int. Cl.
*G06F 1/16* (2006.01)

(52) U.S. Cl.
CPC .......... *G06F 1/1626* (2013.01); *G06F 1/1652* (2013.01); *G06F 1/1679* (2013.01); *G06F 1/1681* (2013.01); *G06F 2200/1633* (2013.01)

(58) Field of Classification Search
CPC .... G06F 1/1626; G06F 1/1652; G06F 1/1679; G06F 1/1681; G06F 2200/1633;
(Continued)

(56) References Cited

U.S. PATENT DOCUMENTS

| 2015/0055287 A1* | 2/2015 | Seo ........................ G06F 1/1681 361/679.27 |
|---|---|---|
| 2015/0370287 A1 | 12/2015 | Ko et al. |

(Continued)

FOREIGN PATENT DOCUMENTS

| CN | 201984375 U | 9/2011 |
|---|---|---|
| CN | 103576742 A | 2/2014 |

(Continued)

OTHER PUBLICATIONS

PCT International Search Report or PCT/CN2019/094274 dated Oct. 8, 2019.

(Continued)

*Primary Examiner* — Rockshana D Chowdhury
(74) *Attorney, Agent, or Firm* — Ladas & Parry LLP

(57) ABSTRACT

A display device includes a display screen and a clipping structure. The display screen includes a bending area, a first end and a second end which are connected with the bending area. The first end is bendable by using the bending area, and the clipping structure is used to clip the second end of the display screen so as to fix the second end during a bending process of the first end. The display device provided by the embodiments of the present application ensures stability of the second end of the display screen.

17 Claims, 4 Drawing Sheets

(58) Field of Classification Search
CPC .... G06F 1/1647; G06F 1/1632; G06F 1/1616; G06F 1/1601; F16M 2200/024; F16M 11/10; F16M 13/02; F16M 11/06
See application file for complete search history.

(56) References Cited

U.S. PATENT DOCUMENTS

| | | | | |
|---|---|---|---|---|
| 2016/0062600 | A1* | 3/2016 | Kim | G06F 3/0482 |
| | | | | 715/765 |
| 2016/0070303 | A1* | 3/2016 | Lee | G06F 1/1641 |
| | | | | 361/679.27 |
| 2017/0045996 | A1* | 2/2017 | Ka | G09G 3/035 |
| 2018/0074553 | A1* | 3/2018 | Yamazaki | H05B 33/02 |

FOREIGN PATENT DOCUMENTS

| | | | |
|---|---|---|---|
| CN | 105979032 | A | 9/2016 |
| CN | 205942525 | U | 2/2017 |
| CN | 206194306 | U | 6/2017 |
| CN | 108041824 | A | 5/2018 |
| CN | 109521840 | A | 3/2019 |

OTHER PUBLICATIONS

PCT Written Opinion of PCT/CN2019/094274 dated Oct. 8, 2019.
Chinese First Office Action for CN Application No. 201811349063.2 dated Nov. 13, 2019.

* cited by examiner

DISPLAY DEVICE

CROSS-REFERENCE TO RELATED APPLICATIONS

The present application is a continuation of International Application No. PCT/CN2019/094274, filed on Jul. 1, 2019, which claims priority to Chinese Patent Application No. 201811349063.2, filed on Nov. 13, 2018. All applications are incorporated herein by reference in their entireties.

TECHNICAL FIELD

Embodiments of the present application relate to the field of display technologies, in particular to a display device.

BACKGROUND

In recent years, with the rapid development of display technologies, display devices with characteristics such as portability and easy storage are increasingly favored, for example, a desktop integrated computer used for a paperless conference. For convenience of use, the existing desktop integrated computer is often divided into different areas such as a display area and an input area. However, when an angle of the display area is needed to be changed, other areas are easily lifted by joints, so that stability of the other areas is extremely poor.

SUMMARY

In view of this, embodiments of the present application provide a display device to solve a problem that an angle invariant area is easy to be warped together when a display angle of an angle variable area of the display screen is changed.

An embodiment of the present application provides a display device. The display device includes a display screen and a clipping structure. The display screen includes a bending area, a first end and a second end which are connected with the bending area. The first end is bendable by using the bending area, and the clipping structure is used to clip the second end of the display screen so as to fix the second end during a bending process of the first end.

In an embodiment of the present application, the clipping structure includes a controlling module, a transmission module and a telescopic module. The transmission module is respectively connected with the controlling module and the telescopic module. The transmission module is used to transmit force between the controlling module and the telescopic module. Operation states of the telescopic module include an extending state and a compressing state. The telescopic module in the extending state is clipped with the second end of the display screen, and the telescopic module in the compressing state is detached with the second end of the display screen. The controlling module is used to output controlling force to control to switch the operation states of the telescopic module.

In an embodiment of the present application, the transmission module includes at least one transmission unit. The telescopic module includes at least one telescopic unit having a same number as the at least one transmission unit and being in one-to-one correspondence with the at least one transmission unit, and any of the at least one transmission unit is respectively connected with a corresponding telescopic unit and the controlling module.

In an embodiment of the present application, the transmission module includes a first transmission unit and a second transmission unit. The telescopic module includes a first telescopic unit and a second telescopic unit. The first transmission unit is respectively connected with the first telescopic unit and the controlling module, and the second transmission unit is respectively connected with the second telescopic unit and the controlling module.

In an embodiment of the present application, an operation state of the first telescopic unit and an operation state of the second telescopic unit are the same, and the controlling module synchronously controls to switch the operation state of the first telescopic unit and the operation state of the second telescopic unit.

In an embodiment of the present application, the first telescopic unit in an extending state and the second telescopic unit in an extending state are respectively clipped to a skew diagonal preset area of the second end of the display screen.

In an embodiment of the present application, the first transmission unit includes a first flexible connecting unit, and the first flexible connecting unit is respectively connected with the first telescopic unit and the controlling module.

In an embodiment of the present application, the first transmission unit further includes a first expanding connecting unit. The first expanding connecting unit includes a through groove, and the first flexible connecting unit is disposed in the through groove of the first expanding connecting unit and movably connected with the first expanding connecting unit.

In an embodiment of the present application, an extending length of the first expanding connecting unit is less than an extending length of the first flexible connecting unit.

In an embodiment of the present application, the first expanding connecting unit is a rigid shell structure or a spring sleeve structure.

In an embodiment of the present application, the second transmission unit includes a second flexible connecting unit, and the second flexible connecting unit is respectively connected with the second telescopic unit and the controlling module.

In an embodiment of the present application, the second transmission unit further includes a second expanding connecting unit. The second expanding connecting unit includes a through groove, and the second flexible connecting unit is disposed in the through groove of the second expanding connecting unit and movably connected with the second expanding connecting unit.

In an embodiment of the present application, an extending length of the second expanding connecting unit is less than an extending length of the second flexible connecting unit.

In an embodiment of the present application, the second expanding connecting unit is a rigid shell structure or a spring sleeve structure.

In an embodiment of the present application, the telescopic unit of the telescopic module includes an elastic connecting unit and a clipping unit, and an end of the transmission unit of the transmission module connected with the telescopic unit passes through the elastic connecting unit and is connected with the clipping unit.

In an embodiment of the present application, the controlling module includes a controlling part and a fixing part connected with the controlling part, the fixing part is connected with the transmission module, and the controlling part controls the fixing part to drive the transmission module move.

In an embodiment of the present application, the controlling module further includes an elastic controlling unit, the elastic controlling unit is connected with the controlling part and located between the controlling part and the transmission module, and the elastic controlling unit controls a stroke displacement of the controlling part.

In an embodiment of the present application, a thickness of the first end of the display screen is less than a thickness of the second end of the display screen.

The display device according to the embodiments of the present application, by fixing the clipping structure to the second end (namely the angle invariant area) of the display screen, avoids a warping phenomenon of the second end when the display angle of the first end (namely the angle variable area) of the display screen is changed, thereby ensuring stability of the second end. In addition, by providing a plurality of transmission units (namely the first transmission unit and the second transmission unit) in the clipping structure and limiting extending lengths and extending shapes of the transmission units all be different, a purpose of fixing the telescopic modules to different positions of the second end of the display screen is realized, which improves fixing stability, and further effectively avoids a warping or sliding phenomenon of the second end (namely the angle invariant area) of the display screen. Furthermore, by fixing the plurality of transmission units of the clipping structure to the same controlling module together, the same controlling module may simultaneously linkage control two telescopic modules, so as to further simplify an operation step of the clamping structure, thereby further simplifying dismounting of the display device.

DETAILED DESCRIPTION OF THE EMBODIMENTS

Clear and complete descriptions of technical schemes of embodiments of the present application, in combination with accompanying drawings shown in the embodiments of the present application, will be given below. Obviously, the described embodiments are only a part, but not all, of the embodiments of the present application. All of other embodiments, obtained by those skilled in the art based on the embodiments of the present application without any inventive effort, fall into the protection scope of the present application.

Figure 1A:
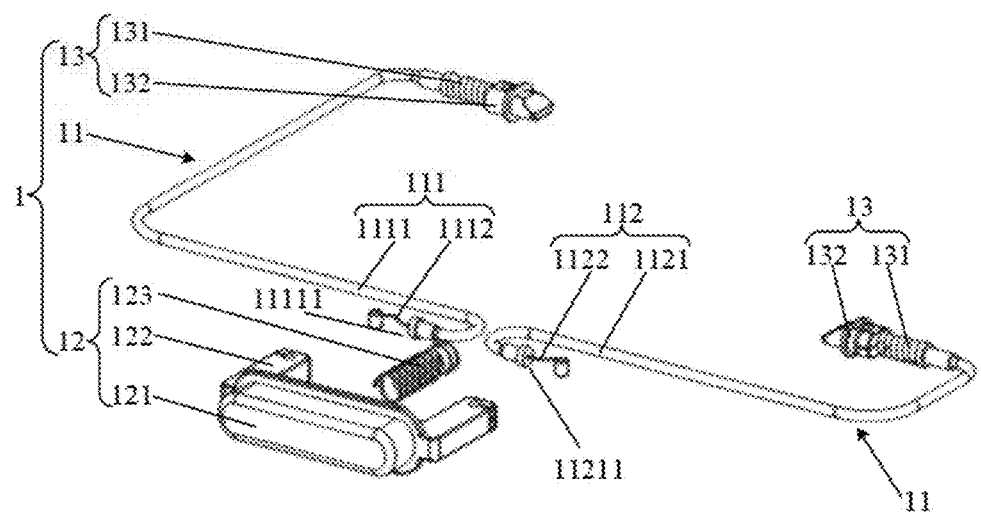
FIG. 1a shows a schematic structural diagram of a clipping structure according to an embodiment of the present application.

FIG. 1a shows a schematic structural diagram of a clipping structure according to an embodiment of the present application. The clipping structure according to the embodiment of the present application is applied to an object to be fixed which needs to be clipped. The object to be fixed includes a bending area, a first end and a second end which are connected with the bending area. The first end may be bent by using the bending area, and the second end does not need to be bent. The first end is an angle variable area, and the angle variable area refers to an area where a display angle may be changed, that is the area with bending or rotating ability. The second end is an angle invariant area, and the angle invariant area refers to an area where a display angle does not need to be changed.

For example, the object to be fixed is a display screen that needs to be fixed to a preset position of a desktop. The display screen includes a display area, an input area and other areas. A display angle of the display area needs to be changed according to an actual demand, that is, the display area is the angle variable area (namely the first end). A display angle of the input area does not need to be changed, that is, the input area is the angle invariant area (namely the second end). A connecting area between the display area and the input area is the bending area. Moreover, a hole or a groove, being clipped by a telescopic module of the clipping structure, is disposed on a preset position of the input area (namely the angle invariant area, the second end) of the display screen. Optionally, a hole or a groove, being clipped by the telescopic module of the clipping structure, is also disposed on the preset position of the desktop.

In the bending area of the object to be fixed, an angle change of the angle variable area (namely the first end) may be realized by using a structure such as a rotating shaft, that is, the angle variable area is connected with other areas by means of the structure such as the rotating shaft. In addition, the angle change of the angle variable area may be realized by using bending flexibility of the area itself. For example, the angle variable area and the angle invariant area are only divided into different areas in function, while in physical sense, the angle variable area and the angle invariable area are integrated into one display screen. However, the display screen is a flexible display screen with bending ability.

As shown in FIG. 1a, a clipping structure 1 according to the embodiment of the present application includes transmission modules 11, a controlling module 12 and telescopic modules 13. Each transmission module 11 is respectively connected with the controlling module 12 and one telescopic module 13. That is, the controlling module 12, by using the transmission modules 11, is indirectly connected with the telescopic modules 13. The transmission modules 11 are used to transmit force between the controlling module 12 and the telescopic modules 13. Operation states of the telescopic module 13 include an extending state and a compressing state. The telescopic module 13 in the extending state is clipped with the second end of the object to be fixed. The telescopic module 13 in the compressing state is detached with the second end of the object to be fixed. The controlling module 12 is used to output controlling force, by a transmitting function of the transmission modules 11, to control to switch the operation states of the telescopic modules 13. The force transmitted by the transmission modules 11 includes the controlling force output by the controlling module 12. The transmission modules 11 may also be referred to as transmission devices. The controlling module 12 may also be referred to as a controlling circuit. The telescopic modules 13 may also be referred to as telescopic devices.

Specifically, each transmission module 11 includes a first transmission unit 111 and a second transmission unit 112. The first transmission unit 111 and the second transmission unit 112 are both linear structures. The linear structure refers to a structure extending in a shape of a straight line or a broken line or a curve, and the first transmission unit 111 and the second transmission unit 112 are relatively arranged. Specifically, the first transmission unit 111 includes a first flexible connecting unit 1112 and a first expanding connecting unit 1111. The first expanding connecting unit 1111 is a rigid shell structure or a spring sleeve structure. That is, the first expanding connecting unit 1111 includes a through groove 11111, and the first flexible connecting unit 1112 is arranged in the through groove 11111 of the first expanding connecting unit 1111. An extending length of the first expanding connecting unit 1111 is less than an extending length of the first flexible connecting unit 1112, so as to realize moving connection. The extending length mentioned above refers to a length extending along a linear connection direction. Force may be applied on the first flexible connecting unit 1112, and thus a displacement of the first flexible connecting unit 1112 in the first expanding connecting unit 1111 may be achieved. That is, the first flexible connecting unit 1112 may be displaced in the first expanding connecting unit 1111. Similarly, the second transmission unit 112 includes a second flexible connecting unit 1122 and a second expanding connecting unit 1121. The second expanding connecting unit 1121 is also a rigid shell structure or a spring sleeve structure. That is, the second expanding connecting unit 1121 also includes a through groove 11211, and the second flexible connecting unit 1122 is arranged in the through groove 11211 of the second expanding connecting unit 1121. An extending length of the second expanding connecting unit 1121 is less than an extending length of the second flexible connecting unit 1122, so as to realize moving connection. Force may be applied on the second flexible connecting unit 1122, and thus a displacement of the second flexible connecting unit 1122 in the second expanding connecting unit 1121 may be achieved. That is, the second flexible connecting unit 1122 may be displaced in the second expanding connecting unit 1121.

The controlling module 12 includes a controlling part 121, two fixing parts 122 connected with the controlling part 121, and an elastic controlling unit 123 connected with the controlling part 121 and located between the controlling part 121 and the transmission modules 11. The controlling part 121 is used to output the controlling force. The fixing parts 122 are used to connect with the transmission modules 11. The elastic controlling unit 123 is used to rebound the controlling module 12 in a first state to a second state, that is, the elastic controlling unit 123 is used to control a stroke displacement of the controlling part 121. The first state refers to a controlling output state of the controlling module 12, that is, a state that the controlling part 121 of the controlling module 12 outputs the controlling force. The second state refers to an uncontrolling output state of the control module 12, that is, a state that the controlling part 121 of the controlling module 12 does not output the controlling force. Specifically, the controlling part 121 and the fixing parts 122 are all strip-shaped structures. The two fixing parts 122 are respectively fixed to both ends of an extending direction of the controlling part 121, and are perpendicularly disposed to the controlling part 121. The elastic controlling unit 123 is arranged on the controlling part 121 and located between the two fixing parts 122.

The telescopic module 13 includes an elastic connecting unit 131 and a clipping unit 132. The elastic connecting unit 131 is a hollow spring structure. An end of the transmission module 11 connected with the telescopic module 13 passes through the elastic connecting unit 131 and is connected with the clipping unit 132.

Figure 1B:
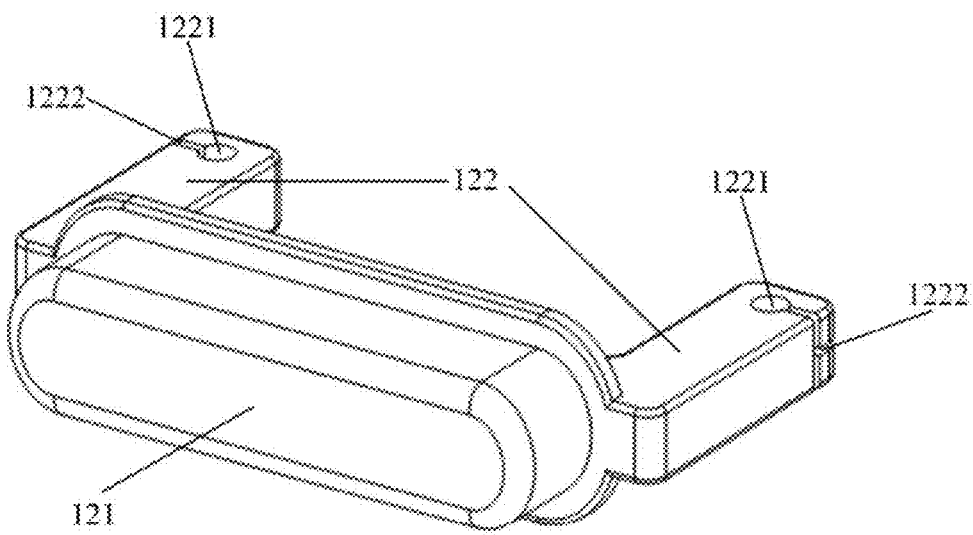
FIG. 1b shows a schematic structural diagram of a controlling module of a clipping structure according to an embodiment of the present application.
Figure 1C:
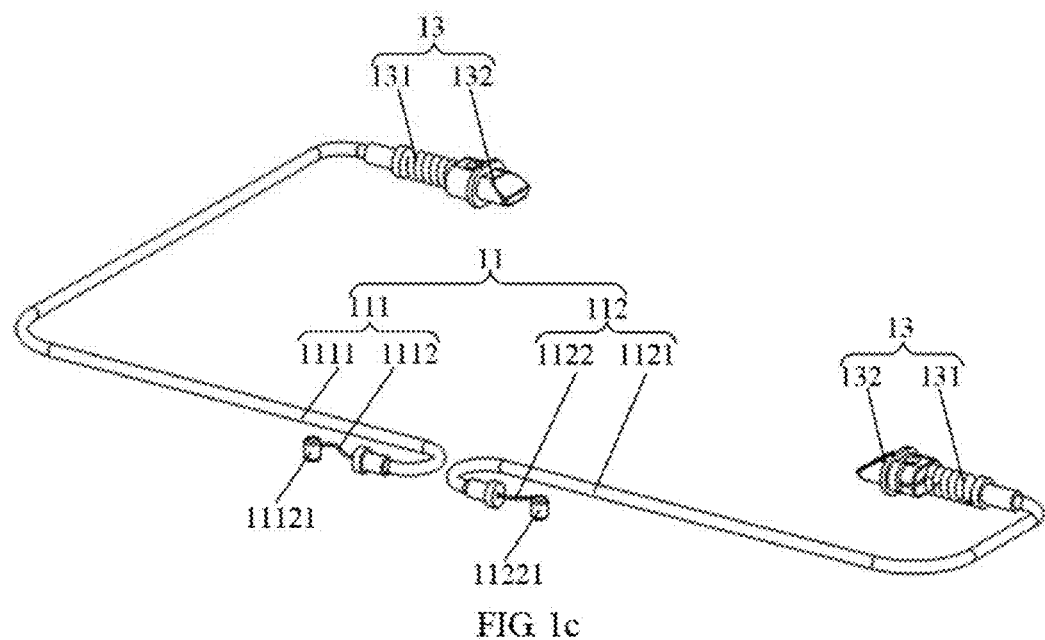
FIG. 1c shows a schematic structural diagram of a transmission module and a telescopic module of a clipping structure according to an embodiment of the present application.

FIG. 1b shows a schematic structural diagram of a controlling module of a clipping structure according to an embodiment of the present application. FIG. 1c shows a schematic structural diagram of a transmission module and a telescopic module of a clipping structure according to an embodiment of the present application.

As shown in FIG. 1b, a bearing hole 1221 and a through hole 1222 penetrating through the bearing hole 1221 are disposed on an end of the fixing part 122 of the controlling module 12 away from the controlling part 121. The through hole 1222 is connected through with the bearing hole 1221, and the through hole 1222 extends through to an outer side surface of the fixing part 122.

As shown in FIG. 1c, in the first transmission unit 111 of the transmission module 11, an end (namely a first connecting end) of the first flexible connecting unit 1112 connected with the controlling module 12 is provided with a clipping pillar 11121, and a second connecting end of the first flexible connecting unit 1112 is connected with the telescopic module 13 on the same side. Similarly, in the second transmission unit 112 of the transmission module 11, an end (namely a first connecting end) of the second flexible connecting unit 1122 connected with the controlling module 12 is also provided with a clipping pillar 11221, and a second connecting end of the second flexible connecting unit 1122 is connected with the telescopic module 13 on the same side. Both the clipping pillar 11121 and the clipping pillar 11221 may be clipped with the bearing hole 1221 at a corresponding position in the controlling module 12, and both the first flexible connecting unit 1112 and the second flexible connecting unit 1122 may be connected through with the controlling module 12 by using the through hole 1222 of the controlling module 12.

In an actual preparation process, firstly the elastic connecting units 131 of the two telescopic modules 13 are respectively sleeved into an end of the first transmission unit 111 of the transmission module 11 connected with the telescopic module 13, and an end of the second transmission unit 112 connected with the telescopic module 13. Then the clipping units 132 of the two telescopic modules 13 are respectively fixed and connected with the end of the first transmission unit 111 connected with the telescopic module 13, and the end of the second transmission unit 112 connected with the telescopic module 13. Then the elastic controlling unit 123 of the controlling module 12 is assembled to a preset position of the controlling part 121. Finally the assembled clipping structure 1 is placed to a preset position of the object to be fixed which needs to be fixed.

In an actual application process, when the clipping structure 1 is clipped with the object to be fixed, the clipping pillar 11121 and the clipping pillar 11221 of the transmission module 11 are respectively clipped to the bearing holes 1221 of the corresponding positions in the controlling module 12. Ends of the telescopic module 13 away from the controlling module 12 are clipped to the angle invariable area of the object to be fixed. When the controlling part 121 of the controlling module 12 is pressed, by means of a connection relationship between the controlling module 12 and the transmission module 11, the fixing parts 122 located in an inner side of the controlling module 12 may drive the first flexible connecting unit 1112 and the second flexible connecting unit 1122 of the transmission module 11 to perform a stretching operation. Since the lengths of the first flexible connecting unit 1112 and the second flexible connecting unit 1122 are fixed, the end of the first flexible connecting unit 1112 connected with the telescopic module 13 and the end of the second flexible connecting unit 1122 connected with the telescopic module 13 are retracted in a direction close to the controlling module 12 (That is, the ends are displaced). Therefore, the telescopic modules 13 are driven retract in the direction close to the controlling module 12 (That is, the telescopic modules 13 are displaced), and then the telescopic modules 13 after a retracting operation may be disengaged from the angle invariable area (not shown in the figures) of the object to be fixed. So far, the clipping structure 1 is separated from the object to be fixed.

When the clipping structure 1 is needed to be clipped with the object to be fixed again, the object to be fixed only needs to be placed to a corresponding position, and then the controlling part 121 of the controlling module 12 is released. The controlling part 121 losing a pressing force, by means of elastic force exerted by the elastic controlling unit 123, returns to an initial position before being pressed (That is, the controlling part 121 is elastically displaced). The controlling part 121 that returns to the initial position before being pressed no longer performs the stretching operation on the first flexible connecting unit 1112 and the second flexible connecting unit 1122. And then since the elastic connecting units 131 of the telescopic modules 13 are no longer subjected to drag force, the elastic connecting units 131 return to an initial state (That is, a state which the controlling module 12 is not pressed). The elastic connecting units 131 that return to the initial state drive the clipping units 132 in the telescopic modules 13, the first flexible connecting unit 1112 and the second flexible connecting unit 1122 move in a direction away from the controlling module 12. Thereby finally the clipping units 132 of the telescopic modules 13 are clipped to the angle invariable area of the corresponding object to be fixed again.

When the clipping structure 1 is clipped with the second end (namely the angle invariant area) of the object to be fixed, the first end (namely the angle variable area) that is not clipped by the clipping structure 1 may change its own display angle according to an actual demand. Due to a clipping and fixing effect of the clipping structure 1, when the display angle of the first end is changed, the second end connected with the first end, by using the bending area of the object to be fixed, may not be warped. Thereby stability of the second end may be ensured.

The clipping structure according to the embodiments of the present application, by means of a linkage cooperation among the transmission module, the controlling module and the telescopic module, realizes fast clipping and disassembling operations to the object to be fixed. When the display screen in the display device includes the bending area, the first end and the second end which are connected with the bending area, and the clipping structure according to the embodiments of the present application is applied to the display device, by means of fixing the clipping structure to the second end (namely the angle invariant area) of the display screen, a warping phenomenon of the second end is avoided when the display angle of the first end (namely the angle variable area) of the display screen is changed. Thereby the stability of the second end is ensured. In addition, by means of disposing a plurality of transmission units (namely the first transmission unit and the second transmission unit) in the clipping structure and limiting extending lengths and extending shapes of the transmission units all be different, the telescopic modules may be fixed to different positions of the second end of the display screen. Therefore, fixing stability is improved, and a warping or sliding phenomenon of the second end (namely the angle invariant area) of the display screen is further effectively avoided. Furthermore, by fixing the plurality of transmission units of the clipping structure to the same controlling module together, the same controlling module may simultaneously linkage control two telescopic modules, so as to further simplify an operation step of the clamping structure.

In another embodiment of the present application, the controlling module 12 does not include the elastic controlling unit 123. Then, when the controlling part 121 of the controlling module 12 is released, the controlling part 121 without the pressing force may be returned to the initial state by using other toggle structures. That is, as long as the controlling part 121 may be returned to the initial position, a specific structure of the toggle structure is not uniformly limited in the embodiments of the present application.

The controlling of the controlling module 12 described in the above embodiments, including pressing, releasing and other actions, may be done manually by a user or by means of other electronic buttons.

Optionally, the flexible connecting unit is a flexible rope.

When the expanding connecting units are the rigid shell structures, the expanding connecting units (such as the first expanding connecting unit 1111 and the second expanding connecting unit 1121) around the flexible connecting units (such as the first flexible connecting unit 1112 and the second flexible connecting unit 1122) may fully ensure the stability of the clipping structure, and avoid the flexible connecting units being out of a preset movable track during a stretching process, or even being stuck. In addition, in the transmission modules 11 described in the above embodiments, peripheries of the flexible connecting units may not be covered by the expanding connecting units. That is, the transmission modules 11 may realize transmission by means of the flexible connecting units.

Optionally, the periphery of each of the flexible connecting units is covered with the spring sleeve structure, that is, the expanding connecting unit is the spring sleeve structure. Similarly, the flexible connecting unit achieves clipping limit with the spring sleeve structure by means of the clipping pillars disposed on both ends of the flexible connecting unit. When the expanding connecting unit is the spring sleeve structure, friction force of the flexible connecting unit may be effectively reduced, so that the controlling force output by the controlling module 12 may be more efficiently transmitted to the telescopic module 13.

The specific number of transmission units included in the transmission module 11 of the clipping structure 1 and a specific position of each transmission unit may be set according to an actual situation, as long as a purpose of stable clipping may be achieved.

Optionally, in an embodiment of the present application, a thickness of the first end (namely the angle variable area) of the object to be fixed is less than a thickness of the second end (namely the angle invariant area). Compared with the thickness of the first end and the thickness of the second end are same or the thickness of the first end is more than the thickness of the second end, the thicker second end may provide greater supporting force for the clipping of the clipping structure, thereby improving the clipping stability between the clipping structure and the second end.

Figure 2A:
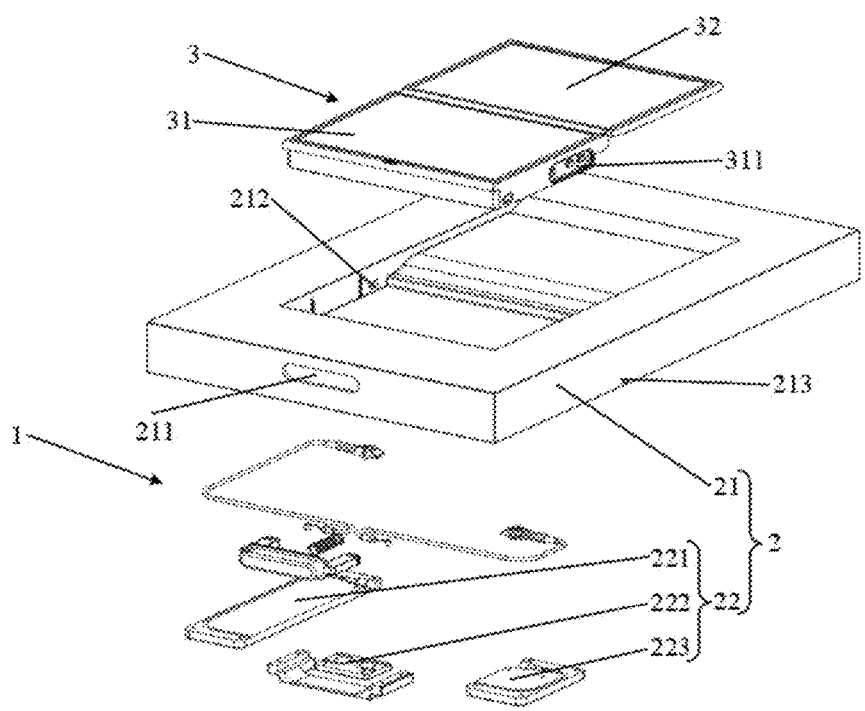
FIG. 2a shows a schematic exploded structural diagram of applying a clipping structure to a display screen body and a screen body bearing structure according to another embodiment of the present application.

FIG. 2a shows a schematic exploded structural diagram of applying a clipping structure to a display screen body and a screen body bearing structure according to another embodiment of the present application. As shown in FIG. 2a, FIG. 2a shows a schematic exploded structural diagram of applying a clipping structure 1 to a display screen body (also known as a display screen) 3 and a screen body bearing structure 2, so as to clip the display screen body 3 into the screen body bearing structure 2. The display screen body 3 includes two display screens connected with each other, namely a first display screen 31 and a second display screen 32. Moreover, the second display screen 32 is bendable or even foldable at different angles (namely an angle variable area, and the first end), the first display screen 31 does not need to be bent or folded (namely an angle invariant area, and the second end). A bendable area connecting the first display screen 31 and the second display screen 32 is a bending area. The screen body bearing structure 2 includes, but is not limited to, a structure such as a desktop used for bearing the display screen body 3.

Specifically, the screen body bearing structure 2 includes a bearing body 21 and a cover plate 22. A groove accommodating the display screen body 3 is provided at a preset position on an upper surface (an upper surface in an orientation shown in FIG. 2a) of the bearing body 21. A groove accommodating the clipping structure 1 is provided at a preset position on a lower surface (a lower surface in the orientation shown in FIG. 2a) of the bearing body 21. In addition, positions of the bearing body 21, corresponding to the display screen body 3 and the clipping structure 1, are provided with a first clipping hole 211, a second clipping hole 212 and a third clipping hole 213. The first clipping hole 211 is used to clip a controlling part 121 of a controlling module 12 of the clipping structure 1. The second clipping hole 212 and the third clipping hole 213 are used to clip a telescopic module 13 of the clipping structure 1. Moreover, the telescopic module 13, by means of the second clipping hole 212 and the third clipping hole 213, is clipped and fixed to a clipping hole 311 on a side surface of the first display screen 31 of the display screen body 3, thereby achieving the purpose of clipping and fixing the display screen body 3 and the screen body bearing structure 2.

Figure 2B:
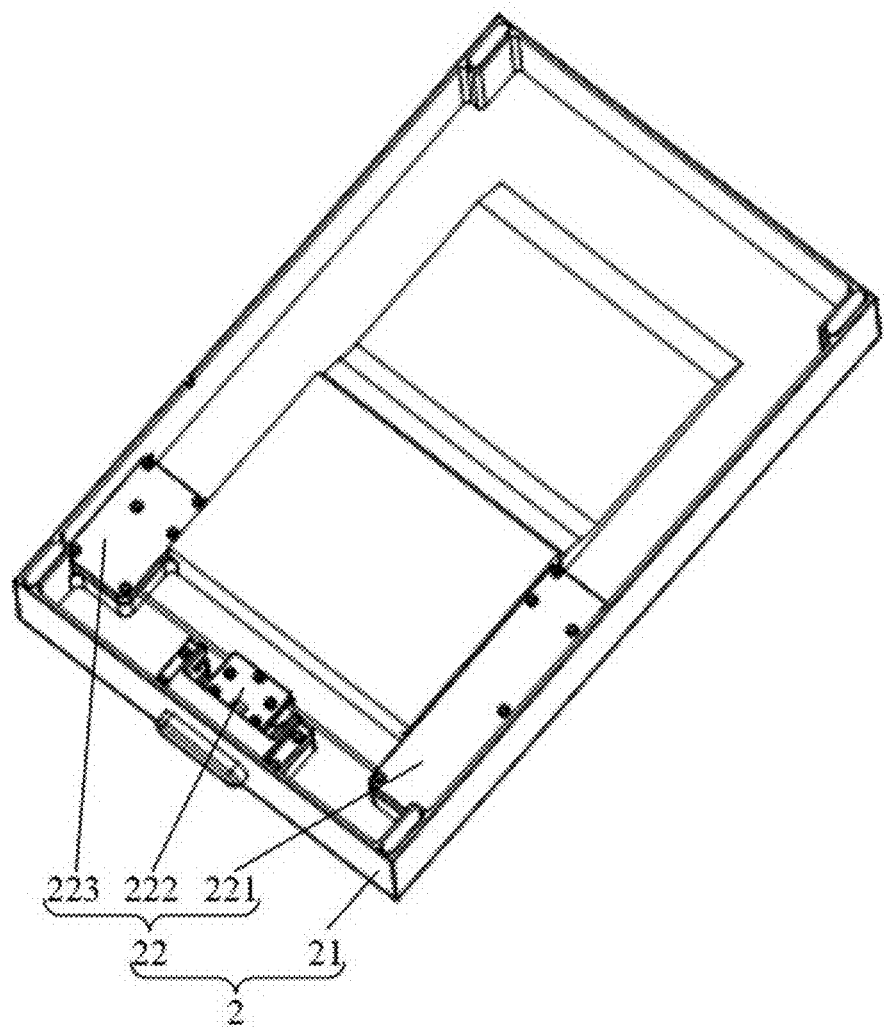
FIG. 2b shows a schematic structural diagram of a first view of a screen body bearing structure including a clipping structure according to another embodiment of the present application.

FIG. 2b shows a schematic structural diagram of a first view of a screen body bearing structure including a clipping structure according to another embodiment of the present application. As shown in FIG. 2a and FIG. 2b, the cover plate 22 includes a first cover plate 221, a second cover plate 222 and a third cover plate 223. The first cover plate 221 is used to cover a first transmission unit 111 and the telescopic module 13 on the same side as the first transmission unit 111 in the clipping structure 1. The second cover plate 222 is used to cover the controlling module 12 in the clipping structure 1. The third cover plate 223 is used to cover a second transmission unit 112 and the telescopic module 13 on the same side as the second transmission unit 112 in the clipping structure 1.

Figure 2C:
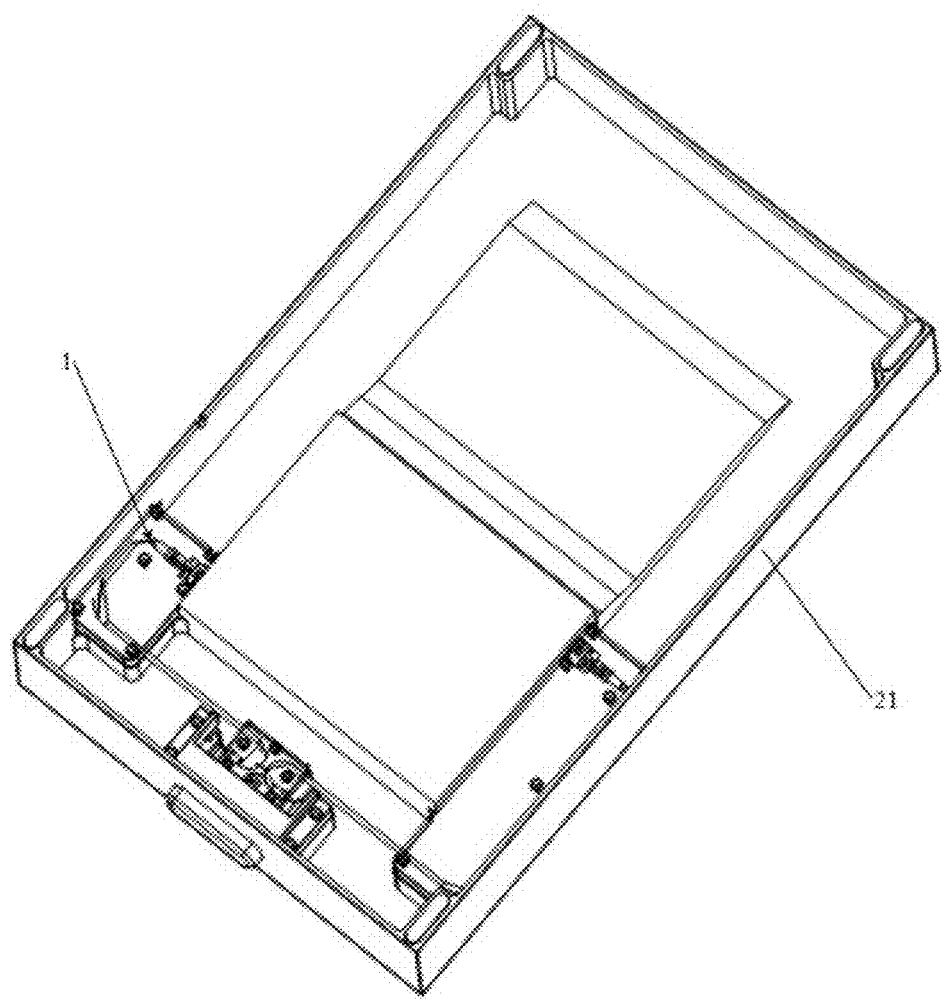
FIG. 2c shows a schematic structural diagram of a second view of a screen body bearing structure including a clipping structure according to another embodiment of the present application.
Figure 2D:
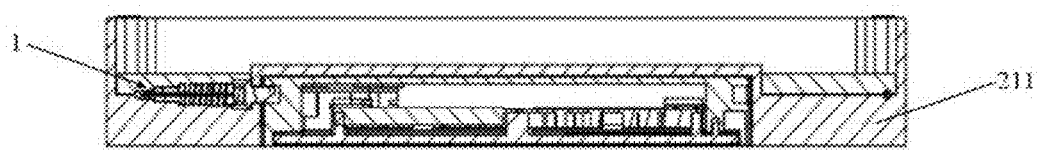
FIG. 2d shows a schematic structural diagram of a third view of a screen body bearing structure including a clipping structure according to another embodiment of the present application.

FIG. 2c shows a schematic structural diagram of a second view of a screen body bearing structure including a clipping structure according to another embodiment of the present application. FIG. 2d shows a schematic structural diagram of a third view of a screen body bearing structure including a clipping structure according to another embodiment of the present application.

As shown in FIG. 2a to FIG. 2d, when the display screen body 3 and the screen body bearing structure 2 are not clipped and fixed by using the clipping structure 1, if a user bends the second display screen 32 to change a display angle of the second display screen 32, the first display screen 31 connected with the second display screen 32 will be warped, so that the first display screen 31 is adversely affected, thereby reducing experience favorability of the user. On the contrary, when the first display screen 31 of the display screen body 3 is clipped and fixed to the screen body bearing structure 2 by using the clipping structure 1 described in the above embodiments of the present application, a warping phenomenon of the first display screen 31 is effectively avoided when the second display screen 32 is bent. In addition, in the embodiment of the present application, the first display screen 31 is a rectangular flat-plate structure, and the two telescopic modules of the clipping structure 1 are respectively disposed to a preset area near a diagonal corner of the first display screen 31. Therefore, stability of the clipping may be further increased, and a probability of the first display screen 31 being warped may be further reduced.

Referring to FIG. 2a to FIG. 2d continuously, an operation method, applying the clipping structure 1 according to the embodiments of the present application to the display screen body 3 and the screen body bearing structure 2 to easily realize that the first display screen 31 of the display screen body 3 is clipped or detached with the screen body bearing structure 2, is as described below.

In an actual application process, an initial state is that the first display screen 31 of the display screen body 3 and the screen body bearing structure 2 are clipped and fixed by means of the clipping structure 1. When the display screen body 3 is wanted to be taken out, that is, when the first display screen 31 of the display screen body 3 is detached with the screen body bearing structure 2, the controlling module of the clipping structure 1 needs to be pressed firstly. The pressed controlling module may pull a transmission module in a direction close to the controlling module, so that the telescopic module connected with the transmission module is pulled out of the second clipping hole 212 and the third clipping hole 213 of the screen body bearing structure 2. At this point, a clipping relationship between the clipping structure 1 and the first display screen 31 of the display screen body 3 is released. Therefore, the display screen body 3 and the screen body bearing structure 2 may be detached.

On the contrary, by means of aligning the first display screen 31 of the display screen body 3 with positions of the screen body bearing structure 2 and the clipping structure 1, and then pressing the first display screen 31 of the display screen body 3 in the direction close to the screen body bearing structure 2, and waiting for the clipping of the clipping hole 311 of the first display screen 31 of the display screen body 3 and the telescopic module of the clipping structure 1, the display screen body 3 and the screen body bearing structure 2 are clipped and fixed again by using the clipping structure 1.

The number of display screens included in the display screen body is not limited to the two pieces mentioned in the above embodiments of the present application, and may be set according to an actual situation.

Another example, in an embodiment of the present application, a display screen body includes a display screen, and the display screen is a flexible display screen with bending ability. The flexible display screen is divided into an angle variable area and an angle invariant area, and a hole or a groove accommodating a clipping unit of a telescopic module of a clamping structure is disposed on a preset position in the angle invariant area.

In an actual application process, when the clipping unit of the clipping structure is clipped into the hole or the groove disposed on the preset position in the angle invariant area, the angle invariant area of the flexible display screen may be clipped by the clipping structure. Therefore, a warping situation of the angle invariant area is avoided when the angle variable area of the flexible display screen is bent or folded. In addition, due to a clipping function of the clipping structure, a bending operation of the angle variable area may not cause a shifting or sliding phenomenon of the flexible display screen, thereby ensuring stability of bending. When the clipping unit of the clipping structure is detached with the hole or the groove disposed on the preset position in the angle invariant area, the flexible display screen is detached with the clipping of the clipping structure.

Optionally, a thickness of a first end (namely an angle variable area) of the display screen is less than a thickness of a second end (namely an angle invariant area). Compared with the thickness of the first end and the thickness of the second end are the same or the thickness of the first end is more than the thickness of the second end, the thicker second end may provide greater supporting force for clipping of a clipping structure, so as to increase clipping stability between the clipping structure and the second end, thereby improving clipping stability between the clipping structure and a display screen.

In an embodiment of the present application, a telescopic module includes a first telescopic unit and a second telescopic unit. It may be understood that both the first telescopic unit and the second telescopic unit can be regarded as the telescopic module 13 mentioned in the above embodiments. The first telescopic unit and the second telescopic unit are respectively clipped to a skew diagonal preset area of a second end of a display screen. The skew diagonal preset area refers to positions clipped by the first telescopic unit and the second telescopic unit, and the positions are not on the same side and not collinear in a horizontal direction or a vertical direction. For example, if the second end is a rectangular plate-shaped structure, then the skew diagonal preset area refers to any diagonal preset range of the rectangular structure. By clipping the first telescopic unit and the second telescopic unit respectively into the skew diagonal preset area of the second end of the display screen, clipping stability of the clipping structure may be further improved, and a sliding phenomenon between the second end of the display screen and the clipping structure may be further avoided.

Optionally, the display screen body 3 and the clipping structure 1 mentioned in the above embodiments are components of a display device. That is, the display device includes the display screen body 3 and the clipping structure 1. The display device includes but is not limited to a desktop computer, a tablet computer and other structures.

Those descriptions above are merely preferred embodiments of the present application, and are not used to limit protection scope of the present application. Any modification, equivalent substitution, improvement, etc. made within the spirit and principles of the present application shall be included in the protection scope of the present application.

What is claimed is:

1. A display device, comprising:
   a display screen comprising a bending area, a first end and a second end being connected with the bending area, the first end being bendable by using the bending area; and
   a clipping structure used to clip the second end of the display screen to fix the second end during a bending process of the first end, wherein
   the clipping structure comprises a controlling module, a transmission module and an telescopic module, the transmission module is respectively connected with the controlling module and the telescopic module, the transmission module is used to transmit force between the controlling module and the telescopic module, operation states of the telescopic module comprises an extending state and a compressing state, the telescopic module in the extending state is clipped with the second end of the display screen, the telescopic module in the compressing state is detached with the second end of the display screen, and the controlling module is used to output controlling force to control to switch the operation states of the telescopic module.

2. The display device of claim 1, wherein the transmission module comprises at least one transmission unit, the telescopic module comprises at least one telescopic unit having a same number as the at least one transmission unit and being in one-to-one correspondence with the at least one transmission unit, and any of the at least one transmission unit is respectively connected with a corresponding telescopic unit and the controlling module.

3. The display device of claim 2, wherein the transmission module comprises a first transmission unit and a second transmission unit, the telescopic module comprises a first telescopic unit and a second telescopic unit, the first transmission unit is respectively connected with the first telescopic unit and the controlling module, and the second transmission unit is respectively connected with the second telescopic unit and the controlling module.

4. The display device of claim 3, wherein an operation state of the first telescopic unit and an operation state of the second telescopic unit are the same, and the controlling module synchronously controls to switch the operation state of the first telescopic unit and the operation state of the second telescopic unit.

5. The display device of claim 3, wherein the first telescopic unit in an extending state and the second telescopic unit in an extending state are respectively clipped to a skew diagonal preset area of the second end of the display screen.

6. The display device of claim 3, wherein the first transmission unit comprises a first flexible connecting unit, and the first flexible connecting unit is respectively connected with the first telescopic unit and the controlling module.

7. The display device of claim 6, wherein the first transmission unit further comprises a first expanding connecting unit, the first expanding connecting unit comprises a through groove, and the first flexible connecting unit is disposed in the through groove of the first expanding connecting unit and movably connected with the first expanding connecting unit.

8. The display device of claim 7, wherein an extending length of the first expanding connecting unit is less than an extending length of the first flexible connecting unit.

9. The display device of claim 7, wherein the first expanding connecting unit is formed as a rigid shell structure or a spring sleeve structure.

10. The display device of claim 3, wherein the second transmission unit comprises a second flexible connecting unit, and the second flexible connecting unit is respectively connected with the second telescopic unit and the controlling module.

11. The display device of claim 10, wherein the second transmission unit further comprises a second expanding connecting unit, the second expanding connecting unit comprises a through groove, and the second flexible connecting unit is disposed in the through groove of the second expanding connecting unit and movably connected with the second expanding connecting unit.

12. The display device of claim 11, wherein an extending length of the second expanding connecting unit is less than an extending length of the second flexible connecting unit.

13. The display device of claim 11, wherein the second expanding connecting unit is a rigid shell structure or a spring sleeve structure.

14. The display device of claim 2, wherein the telescopic unit of the telescopic module comprises an elastic connecting unit and a clipping unit, and an end of the transmission unit of the transmission module connected with the telescopic unit passes through the elastic connecting unit and is connected with the clipping unit.

15. The display device of claim 1, wherein the controlling module comprises a controlling part and a fixing part connected with the controlling part, the fixing part is connected with the transmission module, and the controlling part controls the fixing part to drive the transmission module move.

16. The display device of claim 15, wherein the controlling module further comprises an elastic controlling unit, the elastic controlling unit is connected with the controlling part and located between the controlling part and the transmission module, and the elastic controlling unit controls a stroke displacement of the controlling part.

17. The display device of claim 1, wherein a thickness of the first end of the display screen is less than a thickness of the second end of the display screen.

* * * * *